United States Patent [19]
Yamazaki et al.

[11] 3,861,316
[45] Jan. 21, 1975

[54] FREIGHT CAR CLASSIFICATON SYSTEM AT LEVEL CLASSIFICATION YARD

[75] Inventors: Shigezo Yamazaki, Tokyo; Mitsuru Wakao, Iwatsuki; Yoshinori Kobayashi, Sagamihara, all of Japan

[73] Assignees: Japanese National Railways; Kayabakoyo-Kabushiki-Kaisha, both of Tokyo, Japan

[22] Filed: Apr. 25, 1974

[21] Appl. No.: 464,147

[30] Foreign Application Priority Data
Apr. 25, 1973  Japan.............................. 48-46069

[52] U.S. Cl................ 104/26 R, 104/88, 105/1 A, 213/75 A
[51] Int. Cl............................................. B61b 1/00
[58] Field of Search............ 213/75 A; 104/88, 26 R, 104/27, 29, 26 A; 105/1 A, 7; 246/182 A

[56] References Cited
UNITED STATES PATENTS

| | | | |
|---|---|---|---|
| 2,205,830 | 6/1940 | Flannery........................... | 213/75 A |
| 3,483,367 | 12/1969 | McCune............................ | 104/26 R |
| 3,646,891 | 3/1972 | Murato ............................. | 104/26 R |

Primary Examiner—M. Henson Wood, Jr.
Assistant Examiner—D. W. Keen
Attorney, Agent, or Firm—Saul Jecies

[57] ABSTRACT

A freight car classificaton system at a level classification yard is disclosed which may automatically classify and reclassify the cars to make up a new train. A freight car mover is installed along a receiving track and also along each of several classification tracks for pushing or retarding the cars to a predetermined speed. A group of freight car accelerator-retarders installed along the receiving track is adapted to accelerate or retard the cars at a predetermined speed. Groups of freight car accelerator-retarders installed along the classification tracks are also adapted to accelerate or retard the cars to a higher predetermined speed. An automatic decoupling unit is installed at a suitable position near the first group of accelerator-retarders along the receiving track so that any specific coupling between the cars may be automatically decoupled or disconnected as the cars move. The cars on the receiving track are sequentially pushed to a predetermined speed to the desired classification track and coupled to other freight cars at a predetermined speed. The classified cars on the classification tracks may then be automatically reclassified onto the receiving track to make up a new train.

4 Claims, 10 Drawing Figures

FREIGHT CAR CLASSIFICATON SYSTEM AT LEVEL CLASSIFICATION YARD

BACKGROUND OF THE INVENTION

The present invention relates to an automatic freight car classification system at a level classification yard.

In general, at a level classification yard a train of freight cars is pushed onto a receiving track by a switch engine, and the couplings between the cars to be separated are decoupled. Thereafter, the train is pushed by the switch engine and then stopped abruptly so that the decoupled car or cars may be disconnected from the train and pushed toward the desired classification track. The sorted and pushed cars are then coupled at a predetermined low speed to the car or cars at rest on the classification track. In like manner, all the cars are sorted or classified. Thereafter, the switch engine pushes the cars on the classification tracks to the receiving track in accordance with a predetermined sequence so that a new train may be made up.

The above operations are carried out under the control of a yard officer or operator with the cooperation of the driver or drivers of the switch engines, the switchers, the cutters who decouple the cars, and the riders who ride the cars to apply the hand brakes to slow them to a safe coupling speed. However, car retardation by the riders is very dangerous because the cars are moving at different and relatively high speeds. Furthermore, the switch engine must move back and forth many times in order to make up a new train so that car classification and/or reclassification takes considerable time. Therefore there has been a strong demand for a new automatic freight car reclassification system capable of ensuring safe and fast classification. However, only some parts of the classification system have so far been automated. A fully automatic freight car classification system ensuring safe, fast classification has not yet been developed.

SUMMARY OF THE INVENTION

In view of the above, the present invention has for its object provision of an automatic freight car classification system which may ensure safe, fast classification.

Briefly stated, a freight car classification system at a level classification yard in accordance with the present invention comprises a number of freight car movers installed along a receiving track and a number of classification tracks branched through switches from the receiving track, and equipped to push or retard the cars to a predetermined speed; a first group of freight car accelerator-retarders installed along the receiving track in order to accelerate or retard a car or cars to a predetermined speed; a second group of freight car accelerator-retarders installed along each of the classification tracks to accelerate or retard a car or cars to a higher predetermined speed; and an automatic decoupling unit installed at a suitable position along the receiving track and adapted to disconnect the couplings between selected cars. A train of freight cars pushed onto the receiving track by a switch engine are sequentially pushed at a predetermined speed to a desired classification track. The sorted cars are retarded by the freight car mover in the classification track and either stopped at a predetermined position or coupled to a car or cars already on that track. The cars on the classification tracks are then sequentially pushed to the receiving track in the order of their destinations to make up a new train.

The above and other objects, features, and advantages of the present invention will become more apparent from the following description of one preferred embodiment thereof taken in conjunction with the accompanying drawings.

DESCRIPTION OF THE PREFERRED EMBODIMENT

Figure 1:
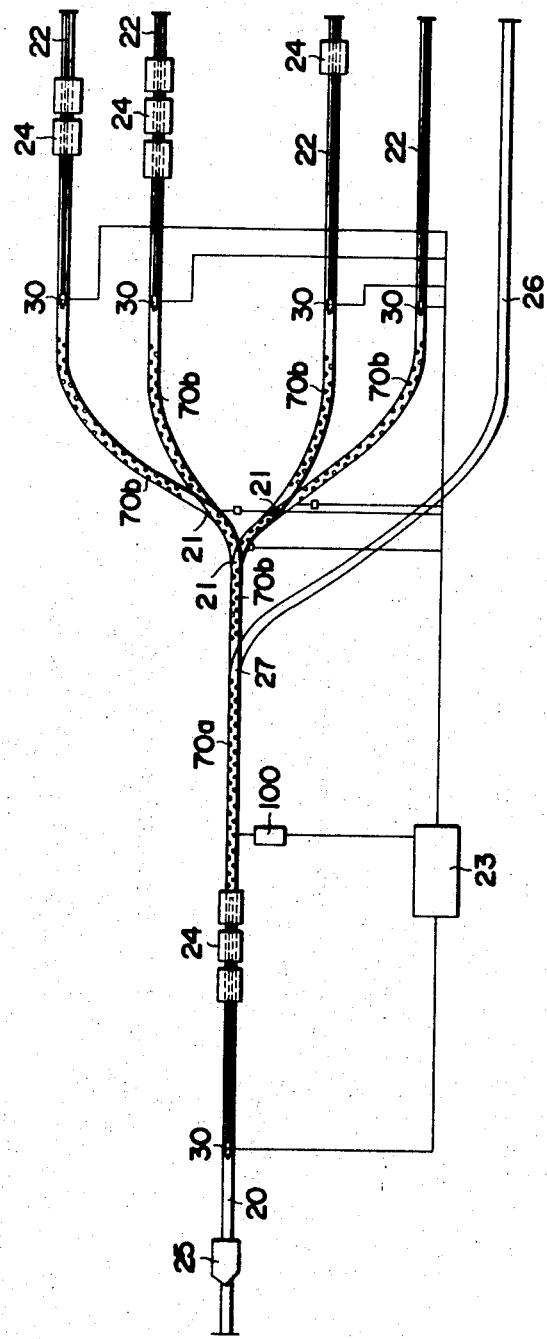
FIG. 1 is the lay-out of a level classification yard to which is applied the freight car classification system in accordance with the present invention.

Referring to FIG. 1, a classification system in accordance with the present invention generally comprises a pulling or receiving track 20 to which is moved a train of freight cars 24 to be classified according to their destinations; a number of classification tracks 22 branching from the receiving track and from each other through switches 21; a number of rolling stock movers 30 installed along the receiving and classification tracks 20 and 22; a number of rolling stock accelerator-retarders 70a and 70b installed along the receiving and classification tracks 20 and 22; an automatic decoupling unit 100 installed at a suitable position adjacent to receiving track 20, and a control unit 23 for automatically controlling the operation of rolling stock movers 30, automatic decoupler unit 100, and switches 21 in accordance with a predetermined program.

The train of freight cars 24 is pulled up to receiving track 20 by switch engine 25 from track 26 through switch 27, and then the cars 24 are classified in accordance with their destinations by means of switches 21, the rolling stock accelerator-retarders 70a and 70b, rolling stock movers 30, and automatic decoupling unit 100, all in response to control signals from control unit 23, as will be described in more detail below.

ROLLING STOCK MOVERS 30, FIGS. 2 AND 3

Figure 2:
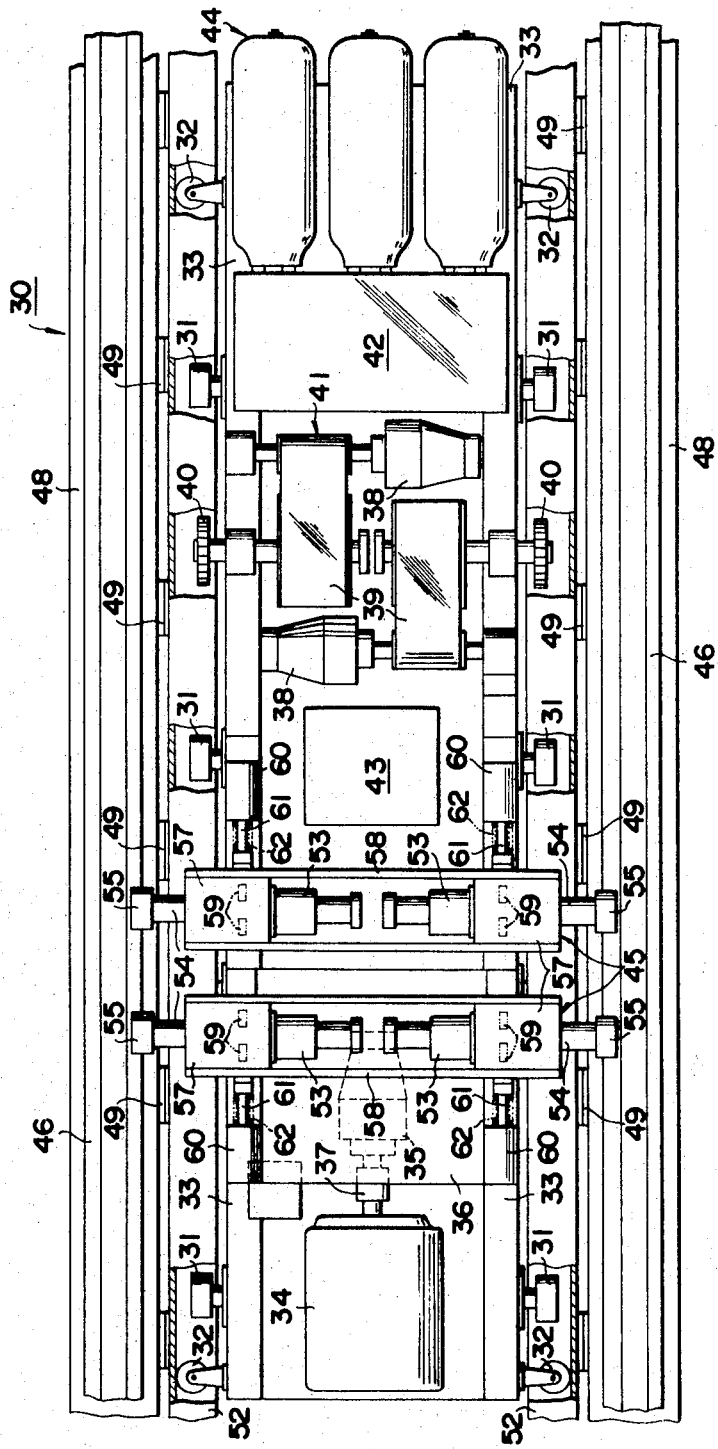
FIG. 2 is the plan of a freight car mover used in the system.
Figure 3:
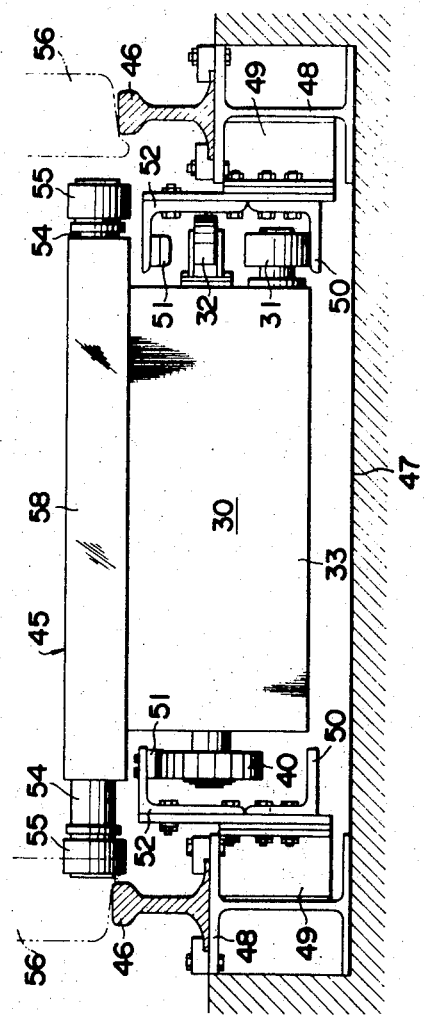
FIG. 3 is the end elevation thereof.

Referring to FIGS. 2 and 3, the rolling stock mover generally indicated by 30 comprises a frame 33 carried by wheels 31 with lateral or guide wheels 32 attached to both sides of the frame. On the frame are mounted a power unit 37 including an hydraulic pump 35 driven by prime mover 34, such as an electric motor or internal combustion engine, and a storage tank 36; a power transmission unit 41 including hydraulic motors 38 driven by working fluid under pressure supplied from pump 35, and reduction gears 39 operatively interposed between hydraulic motors 38 and driving pinions 40 attached to both sides of the frame 33; a control valve assembly 42 for controlling hydraulic motor 38; an electronic control unit 43 for controlling the control valve assembly 42 in response to external signals; an accumulator assembly 44 for temporarily storing working fluid under pressure supplied from hydraulic pump 35; and car wheel catching units 45 adapted to be selectively engaged to the car wheels as will be described in detail below.

As shown in FIGS. 1, 2 and 3, rolling stock movers 30 of the above construction are installed in pits 47 of a predetermined length between the rails 46 of receiving and classification tracks 20 and 22. More particularly, wheels 31 of frame 33 ride over guide rails 50 carried by supporting arms 49 and supports 48 in pit 47, over which are laid rails 46. Driving pinion 40 on each side of frame 33 is in mesh with a rack 51 carried through supporting brackets 52 by supporting arms 49 and spaced above guide rail 50 by a predetermined distance. Therefore, when pinions 40 are driven, rolling stock mover 30 may be moved along guide rails 50 inside pit 47. In this case, lateral wheels 32 on both sides of frame 33 ride along supporting brackets 52 to prevent lateral motion.

Working fluid under pressure supplied directly from pump 35 or indirectly from accumulator assembly 44 is forced into hydraulic motors 38 under control of control valve assembly 42 so that their output torques may be transmitted through reduction gears 39 to driving pinions 40. The direction of movement of rolling stock mover 30 may therefore be reversed by controlling the control valve assembly 42, which reverses the flow of working fluid under pressure to hydraulic motors 38.

Next, the construction of the car wheel catching units generally indicated by 45 will be described. Since the two units 45 are substantially similar in construction, only one unit will be described. Coupling unit 45 comprises two pusher arms 54 which are selectively extended laterally outward by hydraulic cylinders 53. Each pusher arm 54 has a roller 55 attached at its outer end. When pusher arms 54 are extended, rollers 55 engage wheels 56 of the car as shown at left in FIG. 3 and when pusher arms 54 are retracted, rollers 55 are moved away from the wheels as shown at the right. Hydraulic cylinders 53 are mounted upon sliders 57 which in turn are coupled to each other by two side plates 58. Sliders 57 are carried by rollers 59 which in turn ride on guide rails (not shown) laid on frame 33 so that the car wheel coupling unit may be moved in a longitudinal direction.

Hydraulic shock absorbers 60 have their rods 61 connected to sliders 57, and springs 62 are loaded between shock absorbers 60 and rods 61 so that the car wheel catching units 45 are normally biased to move toward each other. Thus hydraulic shock absorbers 60 may absorb impacts produced when rollers 55 engage the car wheels and prevent them from being lifted away from the rails. Springs 62 serve to cause rollers 55 to hold the car wheels firmly between them.

The shift of rollers 55 between their operative and inoperative positions is controlled by control valve assembly 42 which controls direction of flow of the working fluid under pressure to hydraulic cylinders 53.

Figure 4:
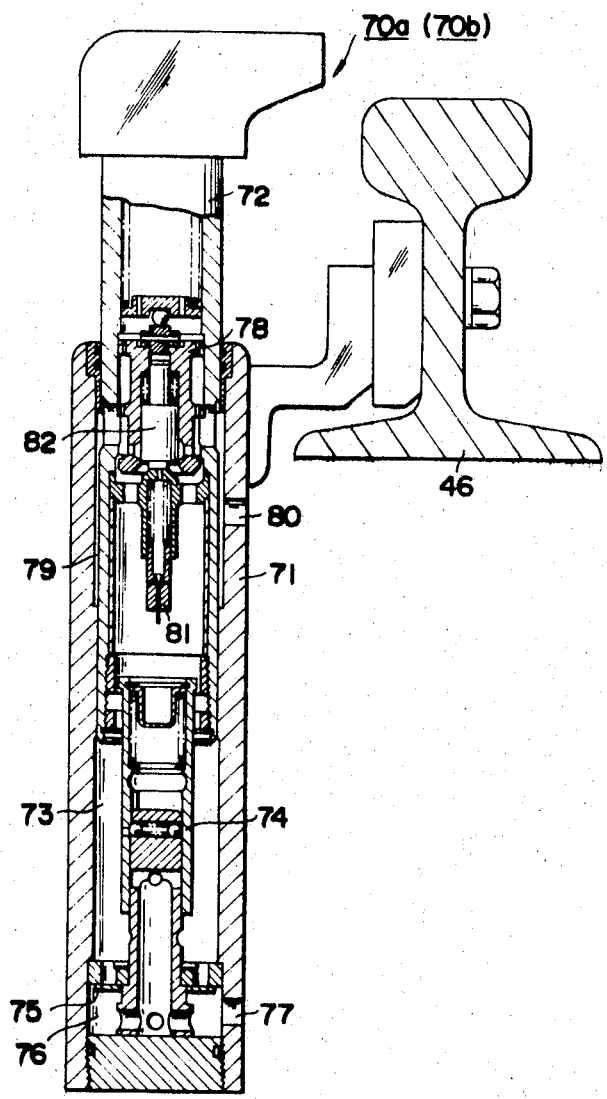
FIG. 4 is a vertical cross-section of a freight car accelerator-retarder used in the above system.

Next, referring to FIG. 4, the rolling stock accelerator-retarders 70a and 70b will be described. Each of them comprises a cylinder 71 supported by track rail 46, and a plunger 72 which is so positioned as to be pushed into cylinder 71 when car wheel 56 rides over it. A chamber defined by plunger 72 and cylinder 71 is divided into intermediate, or variable-volume, and lower chambers 73 and 76 respectfully by a check valve 75, and a sliding valve 74 which is mounted within intermediate chamber 73. Intermediate chamber 73 is connected through check valve 75 with a port 77 of the lower chamber and with a port 80 through an upper chamber 79 and a pressure sensitive valve 78. Plunger 72 has a telescopic-type hydraulic tappet 81, disposed in opposed relation with sliding valve 74, and a pressure-sensitive lock valve 82 is attached to the base of the hydraulic tappet 81.

The groups of rolling stock accelerator-retarders 70a and 70b are arrayed over a predetermined distance along the rails of receiving and classification tracks 20 and 22 as shown in FIG. 1. Port 77 is connected with a high pressure line and port 80 with a return or low pressure line. When a car passes over accelerator-retarder 70a or 70b at a speed in excess of the predetermined value, car wheel 56 pushes plunger 72 into the cylinder 71, at a speed also in excess of a predetermined value. As a result, pressure-sensitive valve 78 is closed in response to hydraulic pressure in excess of a predetermined magnitude produced in intermediate chamber 73, while lock valve 82 is opened so that hydraulic tappet 81 is ready to be actuated. Therefore, sliding valve 74 is not shifted during the whole downstroke of plunger 72, and working fluid under high pressure is forced to flow through check valve 75 and lower chamber 76 to port 77 so that retarding force may be exerted against car wheel 56. When the center of the car wheel passes the axis of plunger 72, hydraulic pressure in intermediate chamber 73 drops suddenly so that pressure-sensitive valve 78 is opened. Low pressure working fluid flows through port 80 into intermediate chamber 73 so that plunger 72 may be extended without applying any accelerating force to wheel 56. On the other hand, when the car passes over accelerator-retarders 70a or 70b at a speed lower than the predetermined speed, plunger 72 is forced into cylinder 71 at a slower speed so that the hydraulic pressure produced in intermediate chamber 73 is less than the predetermined magnitude. Therefore, pressure sensitive valve 78 remains open while lock valve 82 remains closed so that the working fluid in intermediate chamber 73 flows into the low pressure line through pressure-sensitive valve 78, upper chamber 79 and port 80. Therefore, no retarding force is exerted on car wheel 56; but when plunger 72 reaches the end of the down stroke, lock valve 82 actuates hydraulic tappet 81 so as to shift sliding valve 74. Therefore intermediate chamber 73 is connected with the high pressure line so that pressure-sensitive valve 78 is closed. Plunger 72 is caused to lift under high pressure so that plunger 72 is caused to lift under high pressure so that accelerating force is applied to car wheel 56. At the end of the extension stroke sliding valve 74 is returned to its normal position. Thus a car approaching accelerator-retarders 70a or 70b at a speed in excess of the predetermined speed is retarded, while a car approaching the accelerator-retarder at a speed lower than the predetermined speed is accelerated. Thus the cars which have passed accelerator-retarders 70a and 70b are either accelerated or retarded to the predetermined speed.

Figure 5:
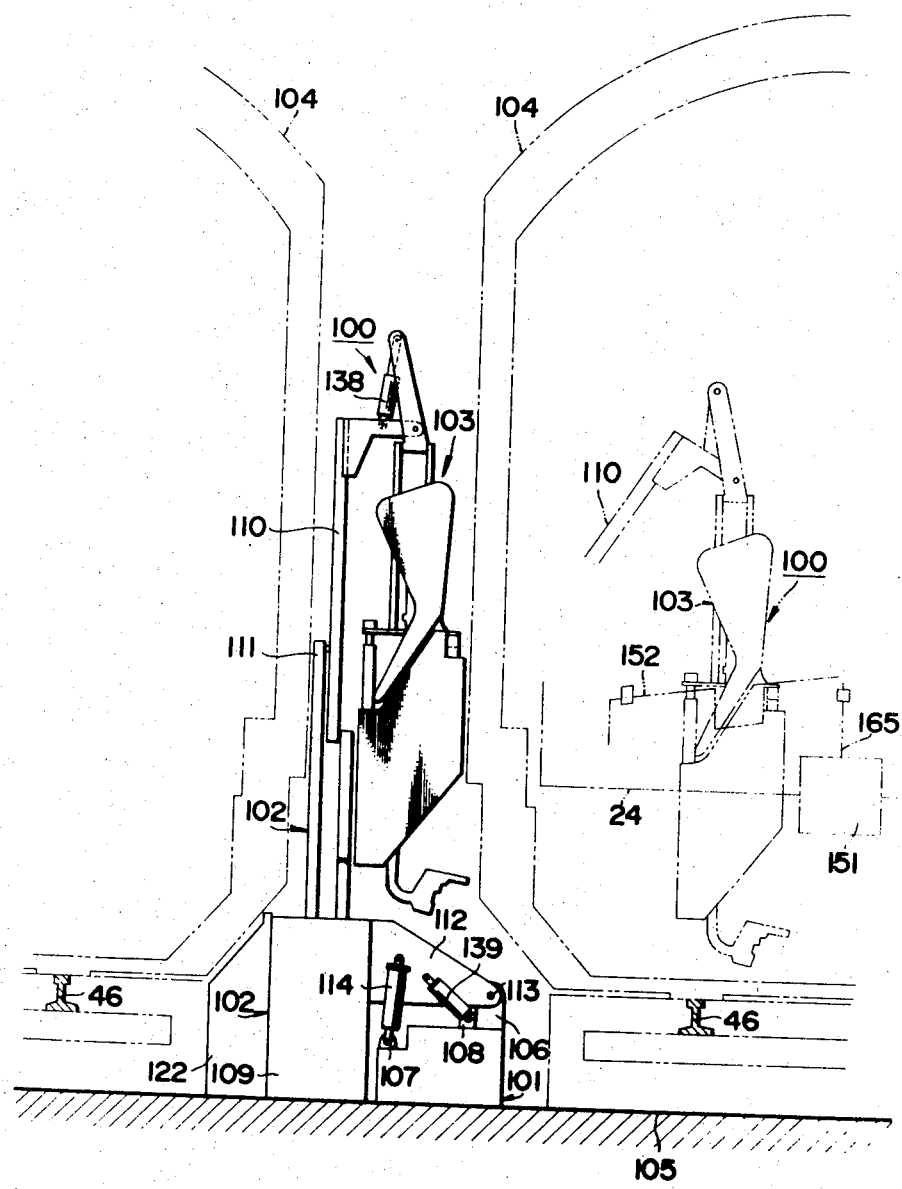
FIG. 5 is the front view of an automatic decoupling unit used in the system.
Figure 6:
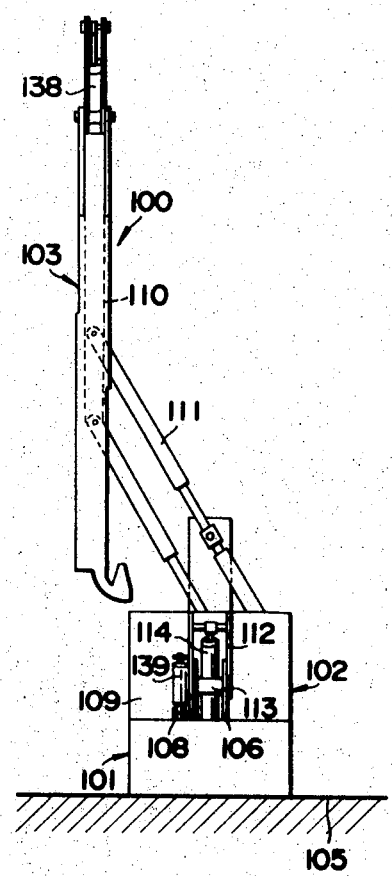
FIG. 6 is a side view thereof.

Next, referring to FIGS. 5 and 6, the automatic decoupling unit 100 installed in receiving track 20 will be described. Automatic decoupling unit 100 generally comprises a base 101, a support mechanism 102 mounted so as to pivot on base 101, and a manipulator 103 suspended from the top of mechanism 102. The decoupling unit is so installed that it is outside the clearance diagram lines indicated by the two-dot chain lines 104 in FIG. 5 when it is in the inoperative position. Base 101 installed upon bed 105 has support brackets 106, 107, and 108 anchored upon the top surface.

Support mechanism 102 comprises a link case 109 and a rod 110, with a parallel linkage 111 to interconnect them. Link case 109 has an arm 112 formed integrally therewith and extending from one side, and pivoted with pin 113 to bracket 106. A tilting cylinder 114 is interposed between arm 112 and bracket 107 on base 101. Therefore, support mechanism 102 comprising link case 109, rod 110, and parallel linkage 111 may be partly rotated about the axis of pin 113 when tilting cylinder 114 is extended from the upright position indicated by the solid lines in FIG. 5 to the tilted or operative position indicated by the chain lines 104 within track rails 46.

Figure 7:
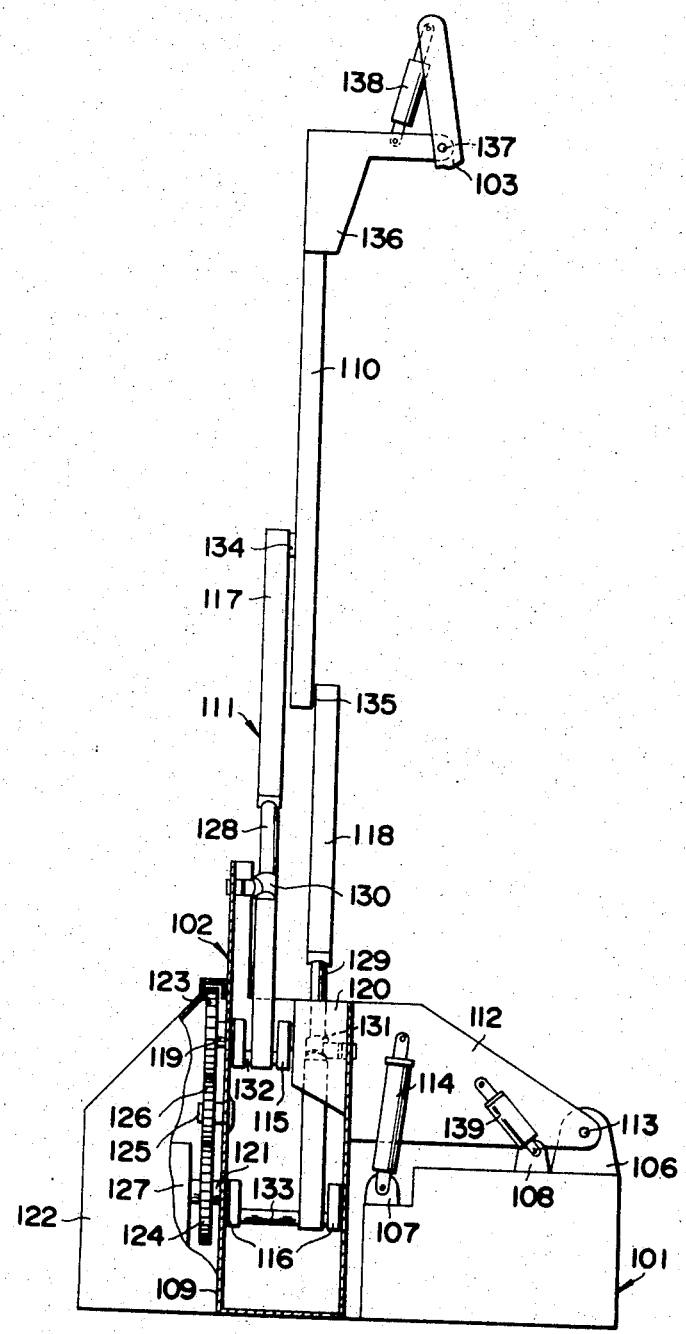
FIG. 7 is a front view thereof with a cover removed in order to illustrate the detail of a support rod mechanism.
Figure 8:
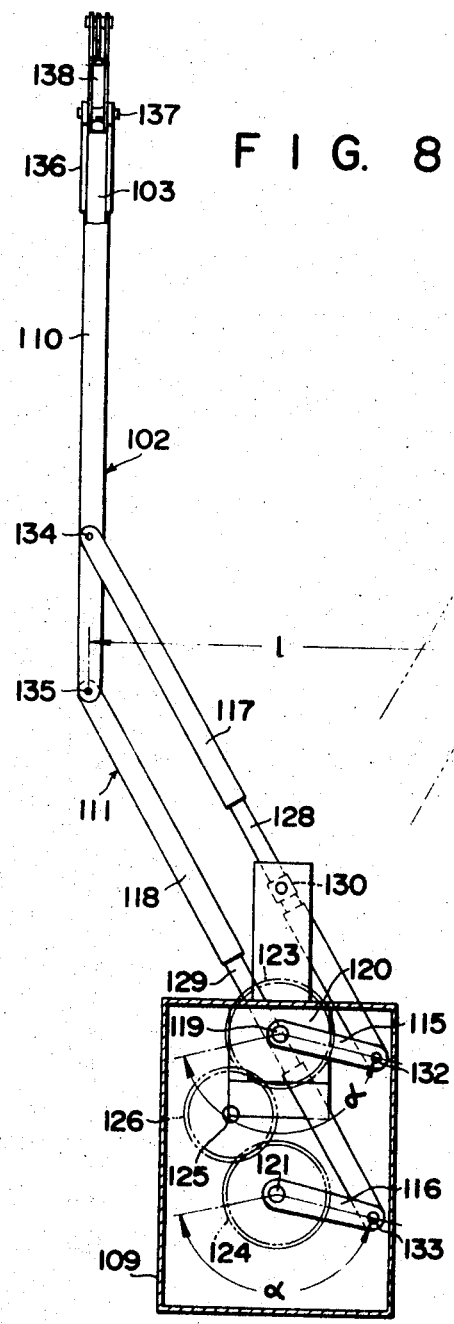
FIG. 8 is the side view thereof.

Parallel linkage 111 includes two crank arms 115 and 116 and two parallel links 117 and 118, as shown in FIGS. 7 and 8. Upper crank arm 115 is supported by a rotary shaft 119 which in turn is supported by one of the side walls of link case 109 and a partition wall 120 within case 109. Lower crank arm 116 is supported by a rotary shaft 121 which in turn is supported by the opposed side walls of link case 109. Gears 123 and 124, which have the same diameter and same number of teeth, are attached to the ends of rotary shafts 119 and 121 and extend from one side wall of link case 122 and are in mesh with timing gear 126 on shaft 125, which in turn is supported by link case 109. Rotary shaft 121 of lower crank arm 116 is driven by rotary actuator 127 disposed in drive case 122 so that when rotary actuator 127 is driven, the upper and lower crank arms 115 and 116 are rotated at the same angular velocity in the same direction in the same plane parallel to each other.

Parallel links 117 and 118 are square in cross-section and have round intermediate portions 128 and 129, respectively, which are slidably supported by rotatable bearing members 130 and 131, respectively, disposed vertically and spaced apart in a relation best shown in FIG. 7. One end of link 117 pivots on pin 132 of crank arm 115 eccentric to rotary shaft 119, while the other end pivots on pin 34 of rod 110. In like manner, one end of lin 118 pivots on pin 133 at the lower end of crank arm 116 eccentric to rotary shaft 121 while the other end pivots on pin 135 of rod 110. Thus rod 110 is held vertically and moved horizontally through distance $l$ when crank arms 115 and 116 rotate through angle $a$ (See FIG. 8) on being driven by rotary actuator 127 through gears 123, 124, and 126, while intermediate portions 128 and 129 of links 117 and 118 slide in their bearings 130 and 131, respectively (See FIG. 7). This assembly resembles, in effect, a pantograph.

Next, referring to FIGS. 7, 8, 9, and 10, the manipulator generally indicated by 103 will be described. Manipulator 103 is pivoted with pin 137 and suspended from hanger 136 mounted at the upper end of the rod 110. A leveling cylinder 138 is interposed between the upper end of manipulator 103 and hanger 136, and another leveling cylinder 139 is interposed between bracket 108 on base 101 and arm 112 of support mechanism 102 (See FIG. 6). When support mechanism 102 is rotated about shaft 113 by tilting cylinder 114, the first leveling cylinder 138 is extended while the second leveling cylinder 139 is retracted, or vice versa, so that manipulator 103 may always be maintained in an upright position regardless of the inclination of support mechanism 102.

Manipulator 103 comprises a main arm 140, two support arms 141 and 142 extended downward from main arm 140, a positioning finger assembly 143, a lock-release finger 144 mounted on support arm 141, and lift fingers 147 and 148 carried by a lift arm 146 which moves vertically along the main arm 140. Pin 137 is fitted through bearing 149 formed at the upper portion of main arm 140 so that manipulator 103 may be suspended from hanger 136 mounted on the rod 110.

The positioning finger assembly 143 carried by support arm 141 serves to maintain the orrect relative position of manipulator 103 with respect to the freight cars when support mechanism 102 is tilted to place manipulator 103 between two cars. Positioning finger assembly 143 has a short finger and a long finger which are opened and closed by a positioning cylinder 150 as shown in FIG. 9.

The lock-release fingers 144 and 145 engage a release lever 152 of coupler 151 of freight car 24 (See FIG. 5) and lift lever 152 so it may be rotated.

The upper lock-release finger 144 is adapted for use with the release lever 152 which decouples the couplers from the above, while lower release finger 145 is adapted for use with the release lever which decouples the couplers from below.

Figures 9, 10:
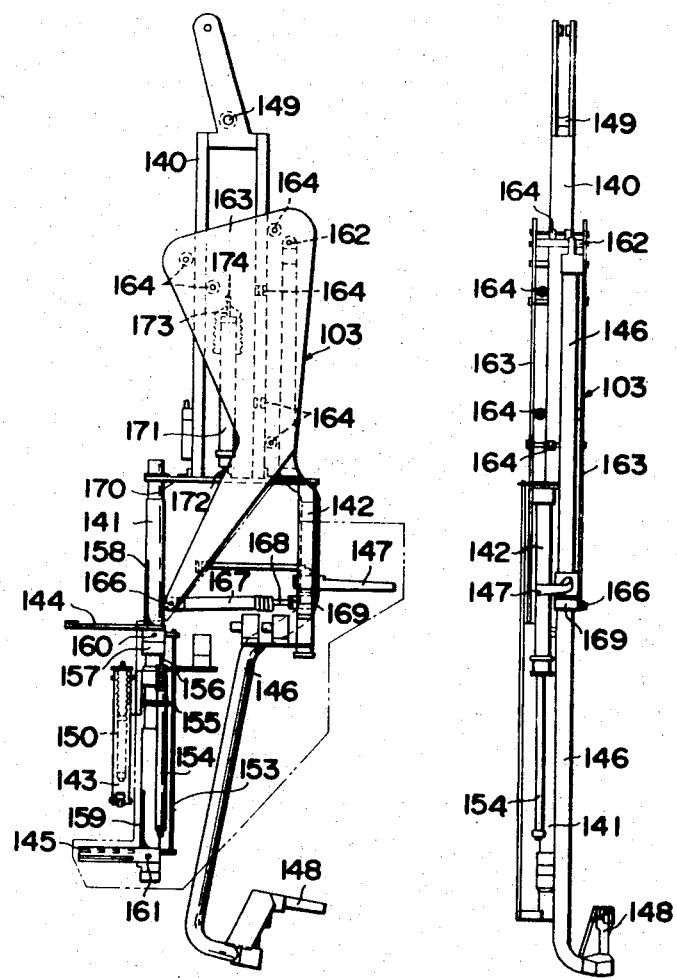
FIG. 9 is the front view of the manipulator of the automatic decoupling unit.
FIG. 10 is a side view thereof.

The upper and lower release fingers 144 and 145 are fitted to slide along support arm 141 in a vertically spaced relation and are connected to each other by connecting rod 153 (See FIG. 9). A lock-release cylinder 154 for actuating lock-release fingers 144 and 145 is mounted on support arm 141 through a support plate 155, and the leading end of its rod 156 is coupled to a pushup ring 157 fitted to slide along support arm 141. Therefore, as lock-release cylinder 154 is extended or retracted, lock release fingers 144 and 145 are moved vertically along support arm 141. Lock-release fingers 144 and 145 are normally kept in the retracted position shown in FIG. 9 in order to prevent them from contacting the cars when manipulator 103 is moved to a position between the cars. Therefore, in the present embodiment, cam grooves 158 and 159 are formed in support arm 141, and screw rods 160 and 161, carried by lock-release fingers 144 and 145, are fitted into cam grooves 158 and 159, respectively. Therefore, when lock-release fingers 144 and 145 are raised by cylinder 154, they are automatically shifted from the retracted position to the operative position.

The upper end of lift arm 146 having the lift fingers 147 and 148 is pivoted on pin 162 of support plate 163 which in turn is carried by rollers 164 for vertical movement along main arm 140. Lift fingers 147 and 148 of lift arm 146 engage and lift a locking member 165 (See FIG. 5) of coupler 151, thereby decoupling the coupler. Upper lift finger 147 is adapted to release lock member 165 upwardly and lower lift finger 147 to release it downwardly. The lower end of support plate 163 is pivoted on pin 166 to the base of an hydraulic cylinder 167 whose rod 168 is connected to coupling member 169 fitted over arm 146. Therefore, lift arm 146 is rotated about pin 162 when hydraulic cylinder 167 is extended so that lift fingers 147 and 148 may be displaced for engagement with lock member 165. Rod 173 of lift cylinder 171 carried with a pin 172 by support plate 170, which horizontally connects support arms 141 and 142, is coupled with a pin 174 to the support plate 163. Therefore, when cylinder 171 is extended, support plate 163 and lift arm 146, and hence lift fingers 147 and 148, are lifted up to raise locking member 165 so that couplers 151 may be decoupled.

Next, the mode of operation of automatic decoupling unit 100 will be described. In response to a control signal applied from control unit 23, tilting cylinder 114 is extended to tilt support mechanism 102 while manipulator 103 is maintained in an upright position by leveling cylinders 138 and 139 so that the manipulator is placed in a predetermined position between the freight cars. In response to the control signal positioning cylinder 150 on manipulator 103 is actuated to open the fingers of positioning finger assembly 143. As one finger of the positioning finger assembly is pushed by the end wall of the freight car, manipulator 103 is moved in a horizontal direction so that the correct position of the manipulator with respect to coupler 151 of the freight car may be maintained. When one finger of positioning finger assembly 143 engages the end wall of the freight car, the start signal of a sequence operation is generated. In response to this signal, lock-release cylinder 154 is extended so that lock-release fingers 144 and 145 are lifted. As a result, release lever 152 of the freight car is raised so that it may be rotated. Upon completion of the above step, cylinder 167 is actuated in response to the control signal so that either of lift fingers 147 or 148 is inserted into a link o of locking member 165 of coupler 151. When the above step is completed, a control signal is generated and transmitted to lift cylinder 171 so that it raises lift fingers 147 and 148. As a result, lock member 165 is lifted away from couplers 151 so that they are decoupled from each other. When the above step is completed, control signals are sequentially applied to manipulator 103 so that the above steps are reversed so as to return the lift and positioning fingers to their initial positions. Thereafter, tilt cylinder 114 is retracted so that support mechanism 102 is returned to its initial upright position so as to retract manipulator 103 from the operative position between the freight cars. Thereafter, rotary actuator 127 is actuated to return manipulator 103 to its initial position.

Freight car movers 30, accelerator-retarders 70a and 70b and automatic decoupling unit 100 are installed along receiving and classification tracks 20 and 22 as shown in FIG. 1, and the mover 30, automatic decoupling unit 100, and switches 21 are controlled by control unit 23.

Next, the mode of freight car classification at a level classification yard with the above arrangement will be described (See FIG. 1). A train of freight cars 24 is pushed by switch engine 25 to receiving track 20, and switches 21 are switched in response to control signals from control unit 23 so that the freight car or cars 24 may be routed onto a predetermined classification track. Control unit 23 gives the signal to freight car mover 30 installed along receiving track 20 so that the mover detects the last freight car of the train in response to a signal from a suitable detector, such as a limit switch, and moves the freight car toward the classification track at a predetermined speed. That is, coupling units 45 engage with car wheels 56 of car 24, and mover 30 moves the car toward classification track 22. When mover 30 moves the car over a predetermined distance, coupling units 45 are retracted in response to a control signal from a suitable detector, such as a limit switch, to release car wheels 56, and then the mover is stopped and returned to its initial position. Thus the car is pushed toward the classification track at a predetermined speed. When the car passes over accelerator-retarders 70a in receiving track 20, it is accelerated or retarded in the manner described above to a predetermined speed, for instance 1 m/sec. When the cars pass automatic decoupling unit 100, the couplers between the desired freight cars are decoupled in the manner described above, but it should be noted that even though the cars are disconnected from each other, they are moving in unison toward the classification tracks at a predetermined speed.

When the cars are passing over the first group of accelerator-retarders 70b in the classification tracks, they are sequentially accelerated to a predetermined speed, for instance 2 m/sec., so that they are separated from each other. Since switches 21 are switched in response to signals from control unit 23 according to the desired destination of the disconnected car or cars, these cars are moved to the predetermined classification track and either stopped by freight car mover 30 at a predetermined position, or are coupled at a suitable speed to another car which has been already sorted on that track. In like manner, the other cars on receiving track 20 may be sequentially and automatically sorted on classification tracks 22.

When it is desired to rearrange the cars on a classification track, that is, when it is desired to resort them into sequence according to their destinations, the above classification steps are reversed. That is, control unit 23 gives the signal to mover 30, which stops the car to be classified first, so that this car is moved toward receiving track 20. When the car passes over accelerator-retarders 70b, it is accelerated to a predetermined speed in the manner described above. When the car leaves mover 30, it is returned to its initial position. Switches 21 are switched in response to the signals from control unit 23 so that the car is further retarded and then stopped at a predetermined position, or is coupled to a desired car on the receiving track. In like manner, the cars on the classification tracks may be sequentially reclassified onto receiving track 20 to make up a new train.

As described above according to the present invention, a train of freight cars pushed to the receiving track by a switch engine may be automatically classified and reclassified as desired. Thus safe and efficient classification and/or reclassification of cars at a level classification yard may be ensured.

What is claimed is:

1. A freight car classification system at a level classification yard comprising:
   a. Freight car movers installed along a receiving track and a number of classification tracks branched through switches from said receiving track and adapted to push or retard a freight car to a predetermined speed;
   b. Freight car accelerator-retarders installed along the receiving and classification tracks between said freight car mover installed along said receiving track on the one hand, and said freight car movers installed along said classification tracks on the other hand, and adapted to accelerate or retard the freight car or cars to more than two predetermined speeds;

c. An automatic decoupling unit installed at a suitable position along said receiving track and adapted to lift a lock member out of any desired coupling between the freight cars running along said receiving track so that the cars may be disconnected from each other, and d. A control unit for automatically controlling the operations of said freight car movers, automatic decoupling unit, and switches in accordance with a predetermined freight car classification program so that the cars on the receiving track may be sorted onto the desired classification tracks or in accordance with a predetermined reclassification program so that the classified cars on the classification tracks may be reclassified to make up a new train on said receiving track.

2. A freight car classification system as defined in claim 1 wherein:

Each of said freight car movers comprises;

a. An hydraulic power unit including an hydraulic pump;

b. A power transmission unit adapted to drive wheels by working fluid under pressure supplied from said hydraulic power unit;

c. Coupling units adapted to selectively engage the wheels of a freight car;

d. An hydraulic control valve assembly adapted to control said hydraulic power unit, power transmission unit, and coupling units, and e. An electrical control unit adapted to control the control valves in said control valve assembly in response to external control signals.

3. A freight car classification system as defined in claim 2 wherein a first group of said freight car accelerator-retarders installed along said receiving track is adapted to accelerate or retard the freight car to a predetermined speed, and each of the groups of said freight car accelerator-retarders installed along the respective classification tracks is adapted to accelerate or retard the freight car to a second predetermined speed higher than the first predetermined speed.

4. A freight car classification system as defined in claim 3 wherein:

a. Said automatic decoupling unit cooperates with said first group of freight car accelerator-retarders, and comprises a manipulator for decoupling the desired couplings between the freight cars, and b. A support mechanism for suspending said manipulator, said support mechanism comprising a tilting mechanism for placing said manipulator at a predetermined position between the freight cars and removing said manipulator from said predetermined position out of the clearance diagram lines, and a support rod including a parallel linkage coupled to be operated by a crank mechanism for moving said manipulator in parallel with the direction of movement of the freight cars.

* * * * *